(12) United States Patent
Bernstein et al.

(10) Patent No.: US 6,480,231 B1
(45) Date of Patent: Nov. 12, 2002

(54) EFFICIENTLY DE-INTERLACING A BUFFER OF IMAGE DATA

(75) Inventors: John Bernstein, San Jose, CA (US); Robert Douglas Ferrell, Los Gatos, CA (US)

(73) Assignee: FlashPoint Technology, Inc., Peterborough, NH (US)

( * ) Notice: Subject to any disclaimer, the term of this patent is extended or adjusted under 35 U.S.C. 154(b) by 0 days.

(21) Appl. No.: 09/535,138

(22) Filed: Mar. 24, 2000

(51) Int. Cl.[7] .................................................. H04N 7/01
(52) U.S. Cl. ....................... 348/448; 348/714
(58) Field of Search ................................ 348/448, 714, 348/715, 716; H04N 7/01

(56) References Cited

U.S. PATENT DOCUMENTS 6,166,773 A * 12/2000 Greggain et al. ........... 348/448

* cited by examiner

Primary Examiner—Sherrie Hsia
(74) Attorney, Agent, or Firm—Sawyer Law Group LLP

(57) ABSTRACT

A method and apparatus for de-interlacing a buffer of image data, wherein scan lines from an image sensor have been transferred to the buffer and stored in a group of even scan lines and a group of odd scan lines. The method for de-interlacing the buffer includes providing a first table to indicate current storage locations of each scan line in the buffer and providing a second table to indicate which scan line is currently stored in each storage location. The first table and a temporary line buffer are then used iteratively swap pairs of scan lines that are stored out of numerical order in the buffer, such that after a swap, one of the scan line in the pair is stored in numerical order in the buffer. After each swap, the first table is updated using the second table, and then second table is updated, such that the first and second tables reflect a change of storage locations for the scan lines, whereby the buffer is de-interlaced in place without using a duplicate buffer.

39 Claims, 5 Drawing Sheets

Image Buffer

| Physical storage locations | | Scan Lines |
|---|---|---|
| 0 | 0 | |
| 1 | 2 | |
| 2 | 4 | |
| 3 | 6 | |
| 4 | 1 | |
| 5 | 3 | |
| 6 | 5 | |
| 7 | 7 | |

FIG. 4A

Forward Index Table

| Indexed by Scan Line | | Current storage location |
|---|---|---|
| 0 | 0 | |
| 1 | 4 | |
| 2 | 1 | |
| 3 | 5 | |
| 4 | 2 | |
| 5 | 6 | |
| 6 | 3 | |
| 7 | 7 | |

FIG. 4B

Reverse Index Table

| Indexed by storage location | | Scan Line |
|---|---|---|
| 0 | 0 | |
| 1 | 4 | |
| 2 | 1 | |
| 3 | 5 | |
| 4 | 2 | |
| 5 | 6 | |
| 6 | 3 | |
| 7 | 7 | |

FIG. 4C

EFFICIENTLY DE-INTERLACING A BUFFER OF IMAGE DATA

FIELD OF THE INVENTION

The present invention relates to de-interlacing image buffers in digital image capture devices, and more particularly to de-interlacing image buffers in devices utilizing image capture sensors, such as CCDs and CMOS sensors that have interlaced output data.

BACKGROUND OF THE INVENTION

The fundamental purpose of a digital imaging device is to convert a view of the real world to a 2-D array of digital pixels. Photons emitted by objects in a scene as well as photons reflected by objects in the scene are focused onto an image sensor by an optical system. The optical system produces a 2-D image of the (usually) 3-D scene and the optics determines the relative focus, depth of field, maximum resolution, etc. of the 2-D image.

The 2-D image incident on the sensor is then converted from photons to electrical charge by the sensor. The sensor is composed of a rectangular grid of photo-sensitive sites, called pixels, and each row of pixels is referred to as a scan line. At each pixel, a charge is accumulated when light falls on that area. In this way, the sensor builds up an array of charges which are a close approximation of the relative brightness of the 2-D image. Typical sensor devices are CCD (charge coupled device) or CMOS (complimentary metal oxide) technology, and have millions of pixels.

Once the sensor has been exposed to the 2-D image for some period of time, the resulting pixel charges must be read from the device. The output signal is typically a series of analog voltages produced sequentially for each pixel location. This type of signal is not readily manipulated by a digital computer. Conversion from analog voltages to digital numbers is accomplished using an ADC (analog to digital converter) which produces an n-bit number given a voltage input, where n is typically 8, 10, or 12 for digital cameras.

A hardware subsystem of the digital computer is used to quickly transfer each digital number produced by the ADC to a buffer within the computer's memory. This subsystem is called a DMA (direct memory access) engine because it directly accesses (writes the image data) memory without the CPU (central processing unit) being utilized. This allows the CPU to perform other operations in parallel, thus making better use of system resources.

The order of pixel read-out from the sensor to the ADC may be either interlaced or progressive scan. In both cases, entire scan lines of pixels are sequentially output as voltages starting at one end of the scan line and proceeding to the other end. In progressive scan devices, the order of read-out of the scan lines is also sequential, starting at either the top or the bottom of the sensor and progressing to the bottom or top, respectively. For example, in a small 4-scan line progressive scan device, the scan lines might be read from top to bottom: 0, 1, 2, 3; or from bottom to top: 3, 2, 1, 0.

By contrast, in an interlaced scan device the order of read-out of the scan lines is not sequential, but rather, first all of the even scan lines are read out in order followed by all of the odd scan lines. For example, a small 4-scan line interlaced scan device might be read from top to bottom: 0, 2, 1, 3; or from bottom to top: 2, 0, 3, 1. FIG. 1 is a block diagram illustrating the contents of a conventional 1208 scan line image buffer after an interlaced transfer.

For purposes of manipulating image data in a digital computer, it is preferred to have the scan lines stored in the buffer memory in a progressive scan order. In some systems, the interlaced scan lines can be easily re-ordered as they are being read-out from the ADC. The actual transfer of data from the ADC to the computer's digital memory is done using DMA (direct memory access). Some processors have DMA engines that are capable of performing this re-ordering of scan lines automatically. This is the most efficient method of de-interlacing the image data since it requires no extra memory or computer processing time (beyond the actual DMA transfer time).

In cases where the DMA engine is not capable of de-interlacing the image scan lines, they must be de-interlaced after they have been transferred to memory using a software algorithm running in the computer. This operation will utilize system resources including, extra memory, CPU processing time, and bus bandwidth.

The most straightforward algorithm for de-interlacing the image scan lines requires a second image buffer in memory which is the same size as the interlaced image buffer. Each scan line is then read from the interlaced buffer and written into the desired scan line position in the resulting progressive buffer.

This method has two disadvantages. First, it requires a potentially large second image buffer. In a digital imaging system, memory is a very limited resource so requiring an entire image buffer is a severe penalty. Second, since the algorithm reads scan lines from one buffer and writes them into another buffer, the memory cache is less likely to help with reducing bus bandwidth used during de-interlacing. This will cause system throughput to suffer. In short, large amounts of memory are unavailable for use elsewhere in the device (e.g. for capturing another image) while the de-interlace algorithm is running.

Accordingly, what is needed is more efficient method for de-interlacing an image buffer. The present invention addresses such a need.

SUMMARY OF THE INVENTION

The present invention provides a method and apparatus for de-interlacing a buffer of image data, wherein scan lines from an image sensor have been transferred to the buffer and stored in a group of even scan lines and a group of odd scan lines. The method for de-interlacing the buffer includes providing a first table to indicate current storage locations of each scan line in the buffer and providing a second table to indicate which scan line is currently stored in each storage location. The first table and a temporary line buffer are then used iteratively swap pairs of scan lines that are stored out of numerical order in the buffer, such that after a swap, one of the scan line in the pair is stored in numerical order in the buffer. After each swap, the first table is updated using the second table, and then second table is updated, such that the first and second tables reflect a change of storage locations for the scan lines.

According to the method and apparatus disclosed herein, the image buffer is de-interlaced in place without the need for an entire duplicate buffer, which save memory and decreases memory transfers, thereby increasing overall system performance.

BRIEF DESCRIPTION OF THE DRAWINGS

FIG. 4A is a diagram illustrating the contents of an example image buffer.

FIG. 4B shows a forward index table generated for the image buffer of FIG. 4A.

FIG. 4C is a diagram illustrating the contents of the reverse index table generated for the image buffer of FIG. 4A.

DETAILED DESCRIPTION

The present invention relates to a method and apparatus for de-interlacing an image buffer containing interlaced image data without copying all the data from the buffer into a second buffer. The following description is presented to enable one of ordinary skill in the art to make and use the invention and is provided in the context of a patent application and its requirements. Although the present invention will be described in the context of a still digital camera, various modifications to the preferred embodiment will be readily apparent to those skilled in the art and the generic principles herein may be applied to other embodiments. That is, any digital imaging capture device that captures and stores digital images, could incorporate the features described herein and that device would be within the spirit and scope of the present invention. Thus, the present invention is not intended to be limited to the embodiment shown but is to be accorded the widest scope consistent with the principles and features described herein.

Figure 1:
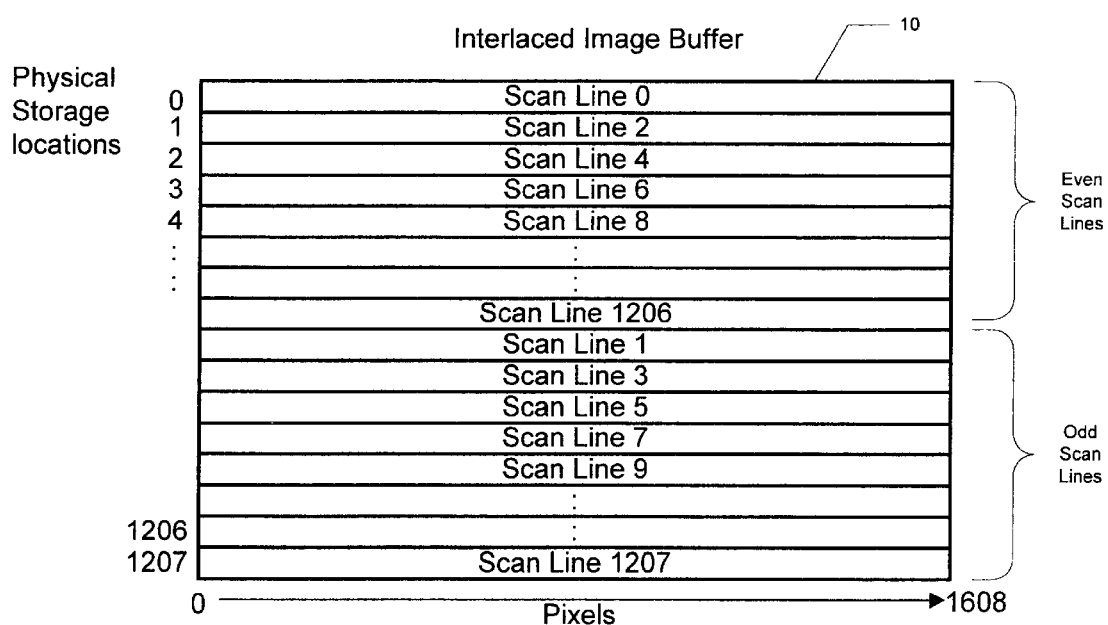
FIG. 1 is a block diagram illustrating the contents of a conventional image buffer after an interlaced transfer.
Figure 2:
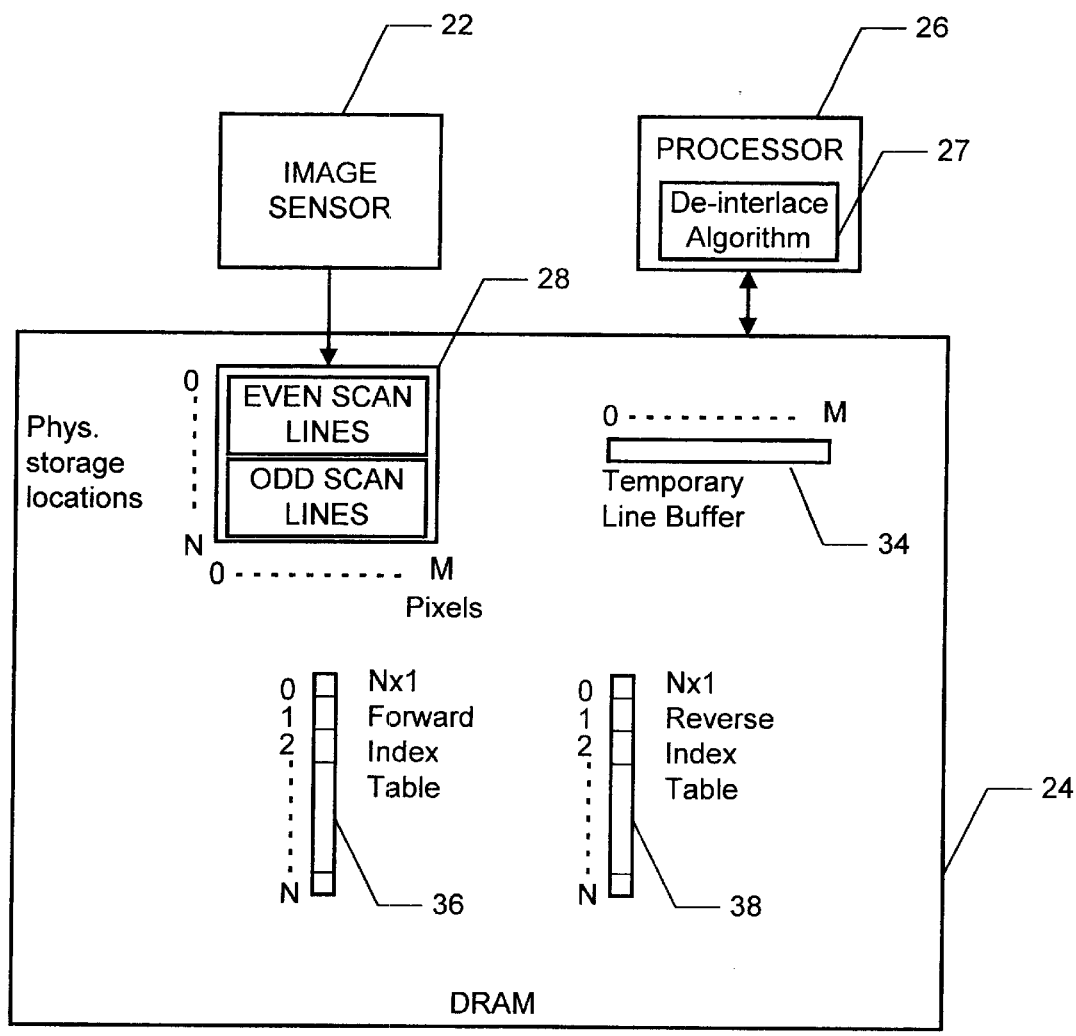
FIG. 2 is a block diagram showing an image capture subsystem of a software-controlled image capture device.

FIG. 2 is a block diagram showing an image capture subsystem of a software-controlled image capture device. The system includes an image sensor 22 for capturing image data, an image buffer 28 in random access memory (DRAM) 24 for storing image data, and a processor 26 for executing image processing algorithms. As explained above, the image buffer 28 comprises 0–N physical storage locations for storing scan lines from the image sensor 22, where each scan line comprises 0–M pixels. When the image data from the image sensor 22 is moved to the image buffer 28 during an interlaced transfer, the scan lines are stored as a group of even scan lines and a group of odd scan lines.

According to the present invention, the image buffer 28 is de-interlaced in place without moving all the data to a duplicate buffer by the de-interlace algorithm 27 executed in the processor 26. The de-interlace algorithm 27 accomplishes this task utilizing a temporary line buffer 34, and two lookup tables (LUT) referred to as a forward index table 36 and a reverse index table 38.

The present invention uses the forward table to indicate the current storage location of each scan line in the buffer and uses the reverse table to indicate which scan line is currently stored in each storage location. The forward table and the temporary line buffer are then used iteratively swap pairs of scan lines that are stored out of numerical order in the buffer, such that after a swap, one of the scan line in the pair is stored in numerical order in the buffer. After each swap, the forward and reverse tables are updated to reflect a change of storage locations for the scan lines.

In a preferred embodiment, both the forward and reverse tables 36 and 38 are N×1 tables, where N equals the number of scan lines. The forward index table 36 is indexed by scan line number and the value at any given location represents the current physical storage location of the corresponding scan line in the image buffer 28.

The reverse index table 38 is indexed by the physical storage location in the image buffer 28, and the value at any given location represents a scan line number. In other words, the reverse index table 38 indicates which scan line is currently stored in each physical storage location in the image buffer 28 and is used to update the forward index table 36, as described below.

The temporary line buffer 34 is a 1×M array capable of storing one scan line of data, where M equals the number of pixels in a scan line. Based on the contents of the forward and reverse index tables 36 and 38, the temporary line buffer 34 is used to efficiently swap two scan lines in the image buffer 28. Thus, the image buffer 28 may be reordered without allocating memory for a second buffer the size of the original image buffer 28. In addition, the forward and reverse index tables 36 and 38 enable the de-interlace algorithm 27 to avoid moving every scan line in the image buffer 28 because the tables indicate whether a scan line is already in its proper storage location in the image buffer 28.

Figure 3:
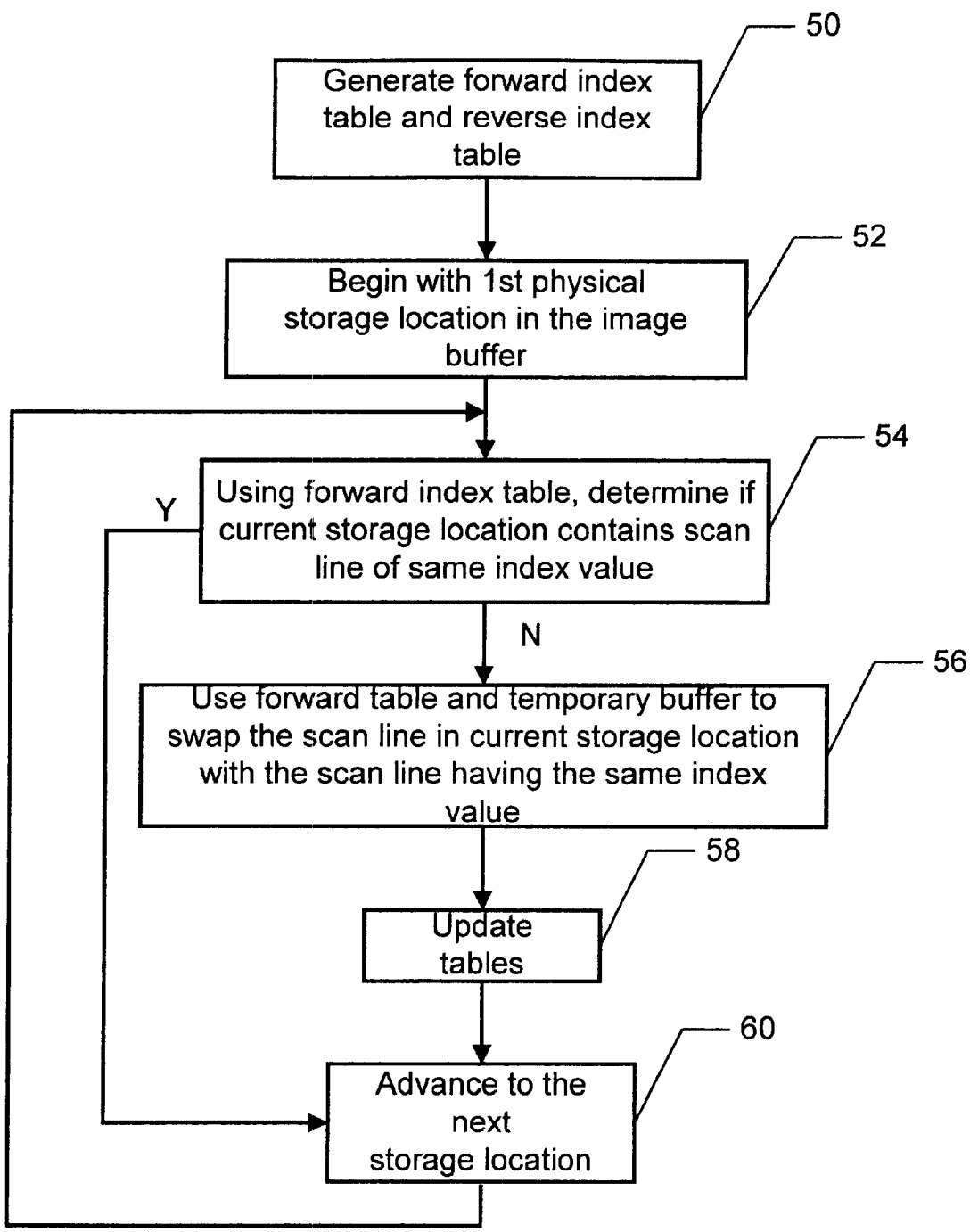
FIG. 3 is a flow chart illustrating a process for de-interlacing a buffer of image data in accordance with the present invention.

FIG. 3 is a flow chart illustrating a process for de-interlacing a buffer of image data in accordance with the present invention. After the scan lines from the image sensor 22 have been transferred to the image buffer 28 and stored in groups of even and odd scan lines, the process begins by generating the forward index table 36 and the reverse index table 38 in step 50.

In a preferred embodiment, the forward index table 36 is generated using an incremented count and the number of rows in the image buffer 28, where the number of rows in the image buffer 28 may be referred to as the "height" of the buffer. The value stored at any given location in the forward index table 36 is a function of whether the count is odd or even, and the height. The forward index table 36 may be generated by the following pseudocode, where Forwardindex is a variable name for the forward index table 36:

For (count=0; count<height; count++){
  if count is an odd number, then
    Forwardindex(count)=(height+count)/2
  if count is an even number, then
    Forwardindex(count)=count/2}

FIG. 4A is a diagram illustrating the contents of an example image buffer 28. The example assumes that the image buffer includes eight storage locations (0–7), where storage locations 0 through 3 store even scan lines 0, 2, 4, and 6, respectively; and storage locations 4 through 7 store odd scan lines 1, 3, 5, and 7, respectively.

FIG. 4B shows a forward index table 36 generated for the image buffer 28 of FIG. 4A. As shown, the forward index table 36 indicates which physical storage location in the image buffer 28 contains any given scan line (e.g, scan line 1 is stored in location 4).

The reverse index table 38 is generated similar to the forward index table 36, except that initially, the values in the reverse index table 38 indicate that the even scan lines are stored in the first half of image buffer 28, and the odd scan lines are stored in the second half of the image buffer 28. The pseudocode for generating the reverse index table 38 is as follows, where Reverseindex is a variable name for the reverse index table 38:

for (count=0; count<height; count++){
  if count<(height/2), then
    Reverseindex(count)=count*2
  else
    Reverseindex(count)=(count*2)−(height−1)}

FIG. 4C is a diagram illustrating the contents of the reverse index table 38 generated for the image buffer 28 of FIG. 4A. The reverse index table 38 is used to update the values in forward index table 36 after two scan lines in the image buffer 28 have been swapped. The reverse index table 38 may be thought of as "given the physical storage location in image buffer 28, what scan line does it contain?" (e.g., location 1 stores scan line 4).

Referring again to FIG. 2, after the forward index table 36 and the reverse index table 38 have been generated, the process loops starting at the first physical storage location in the buffer, and progresses location-by-location through the buffer in step 52. In a preferred embodiment, the loop is controlled by initializing a variable called current_loc representing the value of the current physical storage location, and incrementing the variable by 1 each time through the loop.

Given the current physical storage location, the forward table is accessed to determine whether the current storage location contains the scan line having the same index value in step 54. This comparison may be implemented in pseudocode as:

if Forwardindex (current_loc)=current_loc

For example, the first time through the loop, current_loc=0, and as shown in FIGS. 4A and 4B, Forwardindex (0)=0. This means that physical location 0 in the image buffer 28 contains scan line 0, so the condition is met.

Referring again to FIG. 3, if the forward index table 36 indicates that the current storage location in image buffer 28 contains the scan line of the same value in step 54, then the scan line is in its proper storage location and the process advances to the next storage location in step 60. The process then proceeds to step 54 to perform the comparison again. According to the present invention, scan lines are stored in the proper location are not copied or reshuffled, thereby saving time and storage space.

Figures 5A, 5B, 5C, 5D:
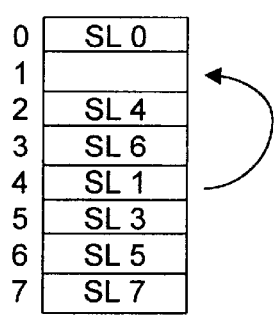
FIGS. 5A–5D graphically illustrate the process of swapping lines in the image buffer using the temporary line buffer.

If the forward index table 36 indicates that the current storage location does not contain the scan line of the same value in step 54, then the forward index table 36 and the temporary line buffer 34 are used to swap the scan line stored in the current storage location with the scan line having the same index value as the current storage location in step 56. According to the present invention, the temporary line buffer 34 is used to store the scan line stored in the current storage location, while the other scan line having the same index value is moved there. In a preferred embodiment, this may be implemented using the pseudocode below, where temp_line is a variable name of the temporary line buffer 34, current_loc is the current storage location value (1), and image_buffer is a variable for the image buffer address. The process of swapping lines in the image buffer 28 using the temporary line buffer 34 is shown graphically in FIGS. 5A–5D, which are indicated next to the corresponding lines of pseudocode:

temp_line=image_buffer(current_loc); (FIGS. 5A and 5B)

image_buffer(current_loc)=image_buffer (Forwardindex(curr_loc)); (FIG. 5C)

image_buffer(Forwardindex(current_loc)=temp_line; (FIG. 5D)

Referring again to FIG. 3, after the two scan lines are swapped in the image buffer 28, the forward and reverse index tables 36 and 38 are out of sync with the current contents of the image buffer 28. Therefore, the forward index table 36 and reverse index table 38 are updated to reflect where the scan lines are now stored in the image buffer 28 in step 58.

In a preferred embodiment, the forward index table 36 is updated to reflect the swapped lines using the reverse index table 38, as shown in the following pseudocode:

temp=Forwardindex(current_loc);

Forwardindex(Reverseindex(current_loc))=temp;

Forwardindex(current_loc)=current_loc;

In a preferred embodiment, the reverse index table 38 is updated to reflect the swapped lines as follows:

Reverseindex(temp)=Reverseindex(current_loc);

Reverseindex(current_loc)=current_loc;

After the forward and reverse index tables 36 and 38 are updated, the current storage location in the image buffer 28 is advanced to the next storage location in step 60, and the process proceeds until the end of the image buffer 28 is reached.

The process of de-interlacing an image buffer in accordance with the present invention will now be explained by way of the examples shown in FIGS. 4 and 5. As stated above, the process begins by determining whether a current storage location in the image buffer contains a scan line of the same index value. Location 0 in the image buffer contains scan line 0, which is correct, so the process moves to the next row of the image buffer, location 1. Scan line 1 needs to be stored and storage location 1, so the forward table is accessed to determine the physical location of scan line 1. Referring to FIG. 4B, this is accomplished by indexing the forward index table with the index value 1. This reveals that the current storage location of scan line 1 in the image buffer is storage location 4. Therefore, the contents of storage location 1 and the contents of storage location 4 must be swapped. The contents of storage location 1 and line 4 are then swapped by moving scan line 2 from storage location 1 into the temporary line buffer (FIGS. 5A and 5B), and moving scan line 1 from storage location 4 to storage location 1 (FIG. 5C). Scan line 2 from the temporary buffer is then moved to storage location 4 (FIG. 5D). The forward and reverse tables are then updated to reflect the swap.

After scan line 1 has been stored in its correct position in the image buffer, storage location 2 is processed. Referring to FIG. 4B, the forward table is index by index value 2 to ascertain the current physical location of scan line 2, which is now stored in storage location 4. Therefore, scan line 4 in storage location 2 in the image buffer is swapped with scan line 2 stored in storage location 4 of the image buffer. Now, both scan lines 2 and 4 are stored in their correct positions in the image buffer. The forward and reverse tables are then updated to reflect this change. The process then repeats for storage locations 3 through 7. Notice that when line 4 is processed, no swapping is necessary, since line 4 is in the correct position.

According to the present invention, the scan lines are stored in the image buffer in numerical order without requiring a duplicate buffer, and therefore saving a substantial amount of memory. Also, not every line of data needs to be moved, as some lines are already stored in the proper order, which increasing overall processing speed.

A method and apparatus for de-interlacing a buffer of image data has been disclosed. Although the present invention has been described in accordance with the embodiments shown, one of ordinary skill in the art will readily recognize that there could be variations to the embodiments and those variations would be within the spirit and scope of the present invention. In addition, software written according to the present invention may be stored on a computer-readable medium, such as a removable memory, or transmitted over a network, and loaded into the digital camera for execution. Accordingly, many modifications may be made by one of ordinary skill in the art without departing from the spirit and scope of the appended claims.

What is claimed is:

1. A method for de-interlacing a buffer of image data, wherein scan lines from an image sensor have been transferred to the buffer and stored in a group of even scan lines and a group of odd scan lines, the method comprising the steps of:
   (a) providing a first table to indicate current storage locations of each scan line in the buffer;
   (b) providing a second table to indicate which scan line is currently stored in each storage location;
   (c) using the first table and a temporary line buffer to iteratively swap pairs of scan lines that are stored out of numerical order in the buffer, such that after a swap, one of the scan line in the pair is stored in numerical order in the buffer; and
   (d) updating the first table using the second table, and updating the second table after each swap, such that the first and second tables reflect a change of storage locations for the scan lines, whereby the buffer is de-interlaced in place without using a duplicate buffer.

2. The method of claim 1 wherein steps (a) and (b) further include the step of generating the first and second tables such that the first and second tables have a dimension of N×1, where N is a total number of scan lines stored in the buffer.

3. The method of claim 2 wherein step (c) further includes the step of providing a 1×M temporary line buffer, where M represents a length of each scan line in pixels.

4. A computer-readable medium containing program instructions for de-interlacing a buffer of image data, wherein scan lines from an image sensor have been transferred to the buffer and stored in a group of even scan lines and a group of odd scan lines, the instructions for:
   (a) providing a first table to indicate current storage locations of each scan line in the buffer;
   (b) providing a second table to indicate which scan line is currently stored in each storage location;
   (c) using the first table and a temporary line buffer to iteratively swap pairs of scan lines that are stored out of numerical order in the buffer, such that after a swap, one of the scan line in the pair is stored in numerical order in the buffer; and
   (d) updating the first table using the second table, and updating the second table after each swap, such that the first and second tables reflect a change of storage locations for the scan lines, whereby the buffer is de-interlaced in place without using a duplicate buffer.

5. The computer-readable medium of claim 4 wherein instructions (a) and (b) further include the instruction of generating the first and second tables such that the first and second tables have a dimension of N×1, where N is a total number of scan lines stored in the buffer.

6. The computer-readable medium of claim 5 wherein instruction (c) further includes the instruction of providing a 1×M temporary line buffer, where M represents a length of each scan line in pixels.

7. An image capture device for de-interlacing a buffer of image data, comprising:
   an image sensor for capturing image data as scan lines;
   a memory, the memory including a buffer for storing the scan lines wherein the scan lines are stored in the buffer as a group of even scan lines and a group of odd scan lines; and
   a processor coupled to the memory for executing image processing algorithms, wherein at least one of the algorithms functions to de-interlace the buffer by performing the steps of:
   (a) providing a first table to indicate current storage locations of each scan line in the buffer;
   (b) providing a second table to indicate which scan line is currently stored in each storage location;
   (c) using the first table and a temporary line buffer to iteratively swap pairs of scan lines that are stored out of numerical order in the buffer, such that after a swap, one of the scan line in the pair is stored in numerical order in the buffer; and
   (d) updating the first table using the second table, and updating the second table after each swap, such that the first and second tables reflect a change of storage locations for the scan lines, whereby the buffer is de-interlaced in place without using a duplicate buffer.

8. The image capture device of claim 7 wherein steps (a) and (b) further include the step of generating the first and second tables such that the first and second tables have a dimension of N×1, where N is a total number of scan lines stored in the buffer.

9. The image capture device of claim 8 wherein step (c) further includes the step of providing a 1×M temporary line buffer, where M represents a length of each scan line in pixels.

10. A method for de-interlacing a buffer of image data, wherein scan lines from an image sensor have been transferred to the buffer and stored in a group of even scan lines and a group of odd scan lines, the method comprising the steps of:
    (a) generating a first index table for storing a plurality of values that are indexed by scan line number, wherein a value at any given location represents a current physical storage location in the buffer for the corresponding scan line;
    (b) generating a second index table for updating the first index table, wherein the second index table stores a plurality of values and is indexed by physical storage locations in the image buffer, and wherein a value at any given location represents a scan line number; and
    (c) starting at the first physical storage location in the buffer, the first physical storage location being a current storage location, performing the steps of;
       (i) accessing the first index table by the current storage location and determining whether the current storage location contains a scan line having a same index value,
       (ii) if no, swapping the scan line stored in the current storage location with a scan line in the buffer having the same index value as the current storage location, and
       (iii) updating the first and second index tables, and advancing the current storage location to a next storage location, and repeating steps (i) through (iii) until a last storage location in the buffer is reached, whereby the scan lines are stored in the image buffer in numerical order without requiring a duplicate buffer.

11. The method of claim 10 wherein steps (a) and (b) further include the steps of generating the first and second index tables such that the first and second index tables have a dimension of N×1, where N is a total number of scan lines stored in the image buffer.

12. The method of claim 11 wherein step (c) further includes the step of implementing step (c)(i) in pseudocode as:
    if Forwardindex (current_loc)=current_loc,
    where Forwardindex is a variable name for the first index table and current_loc is a variable name for the current storage location.

13. The method of claim 12 wherein step (c)(ii) further includes the step of performing the swap using a temporary line buffer.

14. The method of claim 13 wherein step (c) further includes the step of implementing step (c)(ii) in pseudocode as:

temp_line=image_buffer(current_loc)

image_buffer (current_loc)=image_buffer (Forwardindex(curr_loc))

image_buffer(Forwardindex(current_loc)=temp_line, where temp_line is a variable name of the temporary line buffer and image_buffer is a variable for the image buffer.

15. The method of claim 14 wherein step (c)(iii) further includes the step of updating the first table using the second table.

16. The method of claim 15 wherein step (c)(iii) of updating the first table using the second table is implemented in pseudocode as:

temp=Forwardindex(current_loc)

Forwardindex(Reverseindex(current_loc))=temp to Forwardindex(current_loc)=current_loc, where Reverseindex is a variable name for the second index table.

17. The method of claim 16 wherein step (c)(iii) of updating the second table is implemented in pseudocode as:

Reverseindex(temp)=Reverseindex(current_loc);

Reverseindex(current_loc)=current_loc.

18. The method of claim 17 wherein step (a) further includes the step of generating the first index table in pseudocode as:

for (count=0; count<height; count++){
  if count is an odd number, then
    Forwardindex(count)=(height+count)/2
  if count is an even number, then
    Forwardindex(count)=count/2}, where height is the total number of scan lines.

19. The method of claim 18 wherein step (a) further includes the step of generating the second index table in pseudocode as:

for (count=0; count<height; count++){
  if count<(height/2), then
    Reverseindex(count)=count*2
  else
    Reverseindex(count)=(count*2)−(height−1)}.

20. A computer-readable-medium containing program instructions for de-interlacing a buffer of image data, wherein scan lines from an image sensor have been transferred to the buffer and stored in a group of even scan lines and a group of odd scan lines, the instructions for:

(a) generating a first index table for storing a plurality of values that are indexed by scan line number, wherein a value at any given location represents a current physical storage location in the buffer for the corresponding scan line;

(b) generating a second index table for updating the first index table, wherein the second index table stores a plurality of values and is indexed by physical storage locations in the image buffer, and wherein a value at any given location represents a scan line number; and (c) starting at the first physical storage location in the buffer, the first physical storage location being a current storage location, performing the instructions of;

(i) accessing the first index table by the current storage location and determining whether the current storage location contains a scan line having a same index value, (ii) if no, swapping the scan line stored in the current storage location with a scan line in the buffer having the same index value as the current storage location, and (iii) updating the first and second index tables, and advancing the current storage location to a next storage location, and repeating instructions (i) through (iii) until a last storage location in the buffer is reached, whereby the scan lines are stored in the image buffer in numerical order without requiring a duplicate buffer.

21. The computer-readable medium of claim 20 wherein instructions (a) and (b) further include the instructions of generating the first and second index tables such that the first and second index tables have a dimension of N×1, where N is a total number of scan lines stored in the image buffer.

22. The computer-readable medium of claim 21 wherein instruction (c) further includes the instruction of implementing instruction (c)(i) as:

if Forwardindex (current_loc)=current_loc, where Forwardindex is a variable name for the first index table and current_loc is a variable name for the current storage location.

23. The computer-readable medium of claim 22 wherein instruction (c)(ii) further includes the instruction of performing the swap using a temporary line buffer.

24. The computer-readable medium of claim 23 wherein instruction (c) further includes the instruction of implementing instruction (c)(ii) as:

temp_line=image_buffer(current_loc)

image_buffer (current_loc)=image_buffer (Forwardindex(curr_loc))

image_buffer(Forwardindex(current_loc)=temp_line, where temp_line is a variable name of the temporary line buffer and image_buffer is a variable for the image buffer.

25. The computer-readable medium of claim 24 wherein instruction (c)(iii) further includes the instruction of updating the first table using the second table.

26. The computer-readable medium of claim 25 wherein instruction (c)(iii) of updating the first table using the second table is implemented as:

temp=Forwardindex(current_loc)

Forwardindex(Reverseindex(current_loc))=temp to Forwardindex(current_loc)=current_loc, where Reverseindex is a variable name for the second index table.

27. The computer-readable medium of claim 26 wherein instruction (c)(iii) of updating the second table is implemented as:

Reverseindex(temp)=Reverseindex(current_loc);

Reverseindex(current_loc)=current_loc.

28. The computer-readable medium of claim 27 wherein instruction (a) further includes the instructions of generating the first index table by:

for (count=0; count<height; count++){
  if count is an odd number, then
    Forwardindex(count)=(height+count)/2
  if count is an even number, then
    Forwardindex(count)=count/2}, where height is the total number of scan lines.

29. The computer-readable medium of claim 28 wherein instruction (a) further includes the instructions of generating the second index table by:

```
for (count=0; count<height; count++){
    if count<(height/2), then
        Reverseindex(count)=count*2
    else
        Reverseindex(count)=(count*2)-(height-1)}.
```

30. An image capture device for de-interlacing a buffer of image data, comprising:

an image sensor for capturing image data as scan lines;

a memory, the memory including a buffer for storing the scan lines wherein the scan lines have been stored in the buffer as a group of even scan lines and a group of odd scan lines; and a processor coupled to the memory for executing image processing algorithms, wherein at least one of the algorithms functions to de-interlace the buffer by performing the steps of:

(a) generating a first index table for storing a plurality of values that are indexed by scan line number, wherein a value at any given location represents a current physical storage location in the buffer for the corresponding scan line;

(b) generating a second index table for updating the first index table, wherein the second index table stores a plurality of values and is indexed by physical storage locations in the image buffer, and wherein a value at any given location represents a scan line number; and (c) starting at the first physical storage location in the buffer, the first physical storage location being a current storage location, performing the steps of;

(i) accessing the first index table by the current storage location and determining whether the current storage location contains a scan line having a same index value, (ii) if no, swapping the scan line stored in the current storage location with a scan line in the buffer having the same index value as the current storage location, and (iii) updating the first and second index tables, advancing the current storage location to a next storage location, and repeating steps (i) through (iii) a last storage location in the buffer is reached, whereby the scan lines are stored in the image buffer in numerical order without requiring a duplicate buffer.

31. The image capture device of claim 30 wherein steps (a) and (b) further include the steps of generating the first and second index tables such that the first and second index tables have a dimension of N×1, where N is a total number of scan lines stored in the image buffer.

32. The image capture device of claim 31 wherein step (c) further includes the step of implementing step (c)(i) in pseudocode as:

if Forwardindex (current_loc)=current_loc,
where Forwardindex is a variable name for the first index table and current_loc is a variable name for the current storage location.

33. The image capture device of claim 32 wherein step (c)(ii) further includes the step of performing the swap using a temporary line buffer.

34. The image capture device of claim 33 wherein step (c) further includes the step of implementing step (c)(ii) in pseudocode as:

temp_line=image_buffer(current_loc)

image_buffer (current_loc)=image_buffer (Forwardindex(curr_loc))

image_buffer(Forwardindex(current_loc)=temp_line,
where temp_line is a variable name of the temporary line buffer and image_buffer is a variable for the image buffer.

35. The image capture device of claim 34 wherein step (c)(iii) further includes the step of updating the first table using the second table.

36. The image capture device of claim 35 wherein step (c)(iii) of updating the first table using the second table is implemented in pseudocode as:

temp=Forwardindex(current_loc)

Forwardindex(Reverseindex(current_loc))=temp to Forwardindex(current_loc)=current_loc,
where Reverseindex is a variable name for the second index table.

37. The image capture device of claim 36 wherein step (c)(iii) of updating the second table is implemented in pseudocode as:

Reverseindex(temp)=Reverseindex(current_loc);

Reverseindex(current_loc)=current_loc.

38. The image capture device of claim 37 wherein step (a) further includes the step of generating the first index table in pseudocode as:

```
for (count=0; count<height; count++){
    if count is an odd number, then
        Forwardindex(count)=(height+count)/2
    if count is an even number, then
        Forwardindex(count)=count/2},
```
where height is the total number of scan lines.

39. The image capture device of claim 38 wherein step (a) further includes the step of generating the second index table in pseudocode as:

```
for (count=0; count<height; count++){
    if count<(height/2), then
        Reverseindex(count)=count*2
    else
        Reverseindex(count)=(count*2)-(height-1)}.
```

* * * * *